United States

[11] 3,617,129

| [72] | Inventor | Michael L. Skolnick |
| | | Monroe, Conn. |
| [21] | Appl. No. | 875,238 |
| [22] | Filed | Nov. 10, 1969 |
| [45] | Patented | Nov. 2, 1971 |
| [73] | Assignee | United Aircraft Corporation |
| | | East Hartford, Conn. |

[54] INTEROMETRIC OPTICAL ISOLATOR
9 Claims, 6 Drawing Figs.

[52] U.S. Cl. ........................................... 356/106, 350/151
[51] Int. Cl. ........................................... G01b 9/02, G02f 1/22
[50] Field of Search ........................................... 356/106; 350/163, 151, 150

[56] References Cited
UNITED STATES PATENTS
3,466,121   9/1969   Turner ........................... 356/106 RL

*Primary Examiner*—Ronald L. Wibert
*Assistant Examiner*—Conrad Clark
*Attorney*—Melvin Pearson Williams

ABSTRACT: A ring interferometer is provided with a directional anisotropic element, such as a Faraday rotator, to separate the frequencies of the clockwise and counterclockwise travelling waves therein, one of which is chosen as the resonant frequency. The result is that light entering at the resonant frequency through one of the entrance ports of the resulting four-port optical circulator will have to be readily transmitted through the device, while light entering the opposite entrance port at the same frequency will be rejected significantly; the device therefore acts as an optical isolator having high transmission of a forwardly travelling wave and high rejection of a backwardly travelling wave.

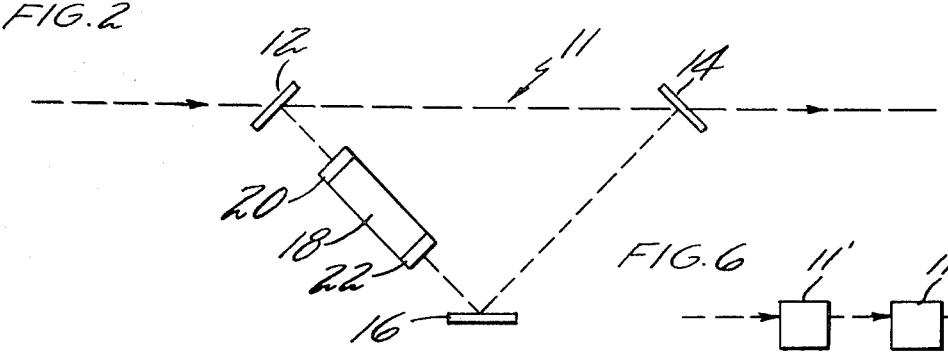
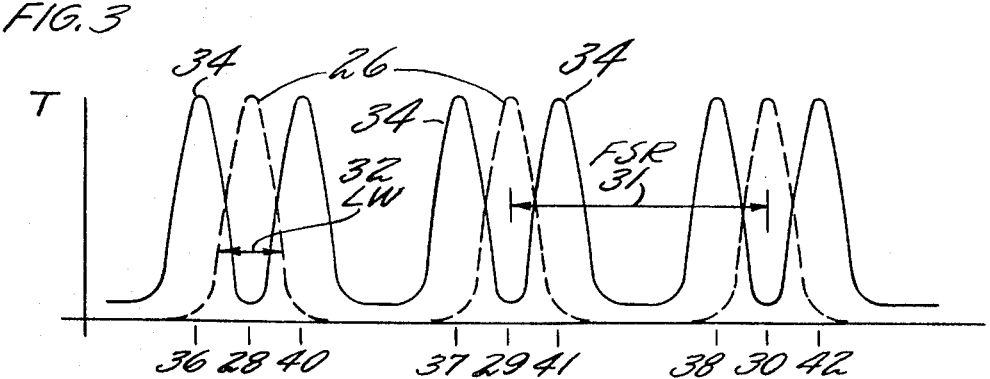
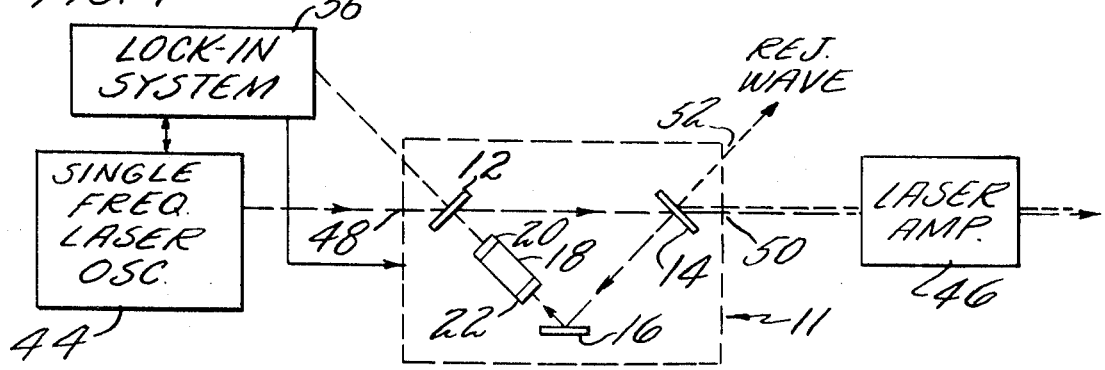
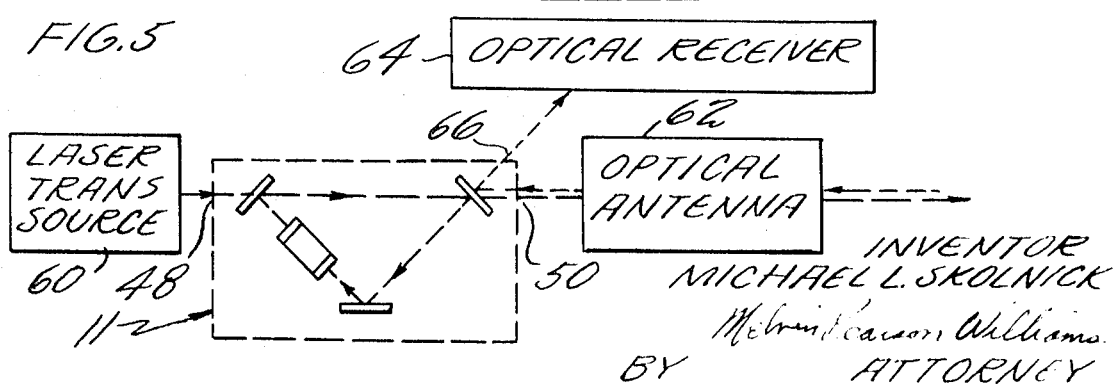

INTERFEROMETRIC OPTICAL ISOLATOR

BACKGROUND OF THE INVENTION

1. Field of the Invention

This invention relates to laser optics, and more particularly to an interferometric optical isolator.

2. Description of the Prior Art

In the optics arts, it is common to employ isolators to prevent feedback between an optical oscillator and an optical amplifier; similarly, optical radars require the separation of the transmitted wave from the received, or back-scattered wave. Other optical isolation requirements are also known. In the prior art, optical isolators most frequently employ linear polarizers separated by a Faraday rotator or the equivalent. THus light travelling in one direction passes through a polarizer of a first orientation and is rotated 45° to pass through an output polarizer. Light entering from the other direction would enter the output polarizer and be rotated 45° in the wrong direction, thus to be 90° out of phase as it meets the input polarizer. In such a fashion, only the light travelling in the desired direction has a significant transmission, and the light travelling in the opposite direction is not transmitted. The rotation of the plane of polarization by 45° requires a Faraday rotator capable of a 22½° phase shift; this in turn either requires very high magnetic fields or an extremely long Faraday rotator path length, or both. Since there is a limit on the maximum magnetic flux that can be established in the Faraday cell, a significant path length must be employed. This results in an absorption of a significant amount of power which, in total, has for example limited operation of prior art optical isolators at $10\mu$ to the range of about 3 watts of power coupled therethrough. Additionally, the rejection ratio is limited to about 20 db (that is a ratio of transmission in the forward and reverse directions of about 100 to 1). In addition, all of the rejected power passes through the Faraday rotator; this results in a very high heat dissipation requirement.

SUMMARY OF THE INVENTION

An object of the present invention is to provide an improved optical isolator.

According to the present invention an optical isolator comprises a directionally anisotropic ring or travelling wave interferometer. In accordance further with the invention, a directionally anisotropic ring or travelling wave interferometer may have at some point in the optical path thereof, a directional anisotropy which can be any device having a different optical path length or different index of refraction for waves travelling in opposite directions. For instance, the present invention may comprise a travelling wave or ring interferometer having a Faraday rotator flanked by a pair of quarter-wave plates.

The present invention overcomes deficiencies of the prior art since its power absorption is extremely small in contrast with the rejection ratio of the isolator. A very small optical path length difference between the waves in each of two directions operates to separate the frequencies of the two waves sufficiently so that one is operating at the resonance of the device and the other is not. Since the finesse and contrast factor of the device are not dependent on the amount of Faraday rotation (other than a minimal amount necessary to split the two frequencies), a very low power absorption characteristic can be achieved with high finesse and contrast factors. Thus, the present invention is not limited in the amount of power that can be coupled therethrough. The present invention finds great utility in isolating oscillators and amplifiers and in separating transmitted and received waves in an optical radar and other systems.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a schematic illustration of an optical isolator;

FIG. 2 is a simplified schematic drawing of an interferometric optical isolator in accordance with the present invention;

FIG. 3 is an illustration of light transmission as a function of frequency in the embodiment of FIG. 2;

FIG. 4 is a simplified schematic illustration of application of the present invention in isolating an optical amplifier from an optical oscillator;

FIG. 5 is a simplified schematic illustration of utilization of the present invention in separating the transmitted and received waves of a common optical antenna; and FIG. 6 is a simplified block diagram of cascaded isolators.

DESCRIPTION OF THE PREFERRED EMBODIMENT

Referring now to FIG. 1, the idea of the optical isolator is to light what the diode is to electric current. In other words, as seen in FIG. 1, a wave travelling from left to right will pass through an optical isolator 10 whereas a wave travelling from right to left will be rejected by the optical isolator 10.

Referring now to FIG. 2, an interferometric optical isolator 11 in accordance with the present invention comprises a closed-loop optical path made up of two partially transmitting mirrors 12, 14 and a fully reflecting mirror 16. At some point in the path, which is shown for convenience only to be between the mirrors 12 and 16, a directional anisotropy is disposed. In the preferred embodiment, the directional anisotropy is one which provides a different optical path length for waves travelling in the clockwise and counterclockwise direction around the optical path provided by the mirrors 12, 14, 16. For instance, the directional anisotropy may comprise a Faraday rotator 18 flanked by quarter wave plates 20, 22. As is known, the Faraday rotator comprises a suitable material with a proper axial magnetic flux therein. For instance, for light in the visible and near-visible spectrums, quartz is suitable; for infrared radiation (such as is encountered in the well-known $CO_2$ laser operating at 10.6 microns) indium antiminide or gallium arsenide may be used. Quarter-wave plates suitable for various frequencies of light are well-known in the art.

The light transmission of the invention illustrated in FIG. 2 is plotted (in solid lines) as a function of frequency ($\nu$) in FIG. 3. The transmission of light through an anisotropic interferometer is plotted by the dotted line 26. It can be seen that there are a series of equally spaced resonances 28–30 which are separated by equal-frequency intervals characterized by the size of the interferometer (the length of its optical path). This separation 31 is called the free spectral range of the interferometer ($FSR$). The line width 32 ($LW$) of transmitted waves is a function of the quality of the interferometer known as finesse ($F$). Specifically, $F=FSR/LW$. The finesse of an interferometer is parametrically related to the losses around the optical path of the interferometer. In the case of the embodiment of the present invention illustrated in FIG. 2, losses are a function of the quality of the mirrors and the amount of absorption in the quarter-wave plates and the Faraday cell. Illustrated in solid lines 34 in FIG. 3 is a plot of transmission of light as a function of frequency in the apparatus of FIG. 2 (that is, including the directional anisotropy of the present invention). The Faraday rotator causes the frequency of the wave travelling in the clockwise direction to be split from the frequency of the wave travelling in the counterclockwise direction, as illustrated in FIG. 3. This is due to the effective different optical path length for waves travelling in opposite directions through a Faraday rotator, as is known in the art. Whether the clockwise frequency will be lower or higher than the counterclockwise frequency depends on the orientation of the axial magnetic flux in the Faraday rotator, and therefore it will not be specified in detail here. In any event, one wave (either clockwise or counterclockwise) will have higher transmission at frequencies indicated at 36–38 in FIG. 3, and the other wave (counterclockwise or clockwise, respectively) will have higher transmission at the frequencies indicated at 40–42 in FIG. 3. Of course, high transmission will be seen at the indicated frequencies only for the wave travelling in the given direction: thus, when measuring transmission for the clockwise wave, it must be done by utilizing the mirror 12 as an entrance port; similarly, to view the response to the device to the counterclockwise wave, it must be done by utilizing the mirror 14 as the entrance port. The illustration of FIG. 3 is a composite of these two responses.

The utility of the present invention may be found in isolating a laser amplifier from a laser oscillator as is illustrated in FIG. 4. Therein, an oscillator 44 capable of generating a relatively spectrally pure wave is separated from an amplifier 46, which generates high-power laser radiation at the frequency of the oscillator 44, by the isolator 11 in accordance with the present invention. The isolator 11 comprises a four-port optical circulator, an entrance port 48 thereof receiving a forward wave from the oscillator 44, and the port 50 providing the forward wave to the amplifier 46. Any radiation which tends to emanate from the amplifier 46 and travel backwardly to the oscillator 44 is received at the port 50, but is rejected by the isolator 11. In fact, it will be transmitted through a port 52 (conceptually) where it may be dissipated in an absorber or just ignored. The important thing to notice is that if the parameters of the isolator 11 are properly adjusted with respect to the frequency of the oscillator 44 so that light entering the port 48, thereby travelling from left to right as seen in FIG. 4 and clockwise about the path of the isolator 11, has a high transmission, the light of the same frequency entering the port 50 and travelling in a counterclockwise direction about the path of the isolator 11 will have a low transmission, provided that the line width of the isolator is less than the separation in frequency provided by the Faraday rotator 18.

In a practical system, the apparatus of FIG. 4 may include a lock-in system 56 of the type which is known in the art. Such a system may include means to provide modulation of the path length of the isolator 11 together with a synchronous detector or lock-in amplifier which monitors the amplitude and phase of light rejected from the mirror 12 as a result of modulation causing a difference between the forward frequency (clockwise in FIG. 4) of the isolator 11 and the frequency of the laser oscillator 44. There are a wide variety of such systems known to the prior art, a number of which are perfectly suitable to stabilize the operating frequencies of the isolator 11 and oscillator 44 in a known fashion. An example of such a system in a microwave embodiment is: R. V. Pound, Rev. Sci. Inst. 17, 490 (1946). An optical system example is: M.S. Lipsett et al. Applied Optics 5, 823 (1966).

Another utilization of the present invention is illustrated in FIG. 5 wherein the isolator 11 is disposed between a laser transmitter source 60 and an optical antenna 62. This permits the optical antenna to transmit optical power outwardly and receive optical signals (such as reflected from targets within a radar field) while separating the received optical wave for utilization at an optical receiver 64. This is similar to the utilization of a T/R tube in microwave radar. In FIG. 5, the four-port circulator utilizes the port 48 as an entrance port, the port 50 both as an exit and as an entrance port, and an additional port 66 as an exit port for the received signal. The apparatus of FIG. 5 also may comprise a communication system (rather than a radar system). In other words, whenever a common optical antenna is to be utilized for both transmitted and received waves, the separation of which is desired, an isolator 11 in accordance with the present invention may be utilized to advantage.

Thus, there has been described an interferometric optical isolator, which in a preferred form comprises a four-port circulator. The isolator is achieved by providing a ring interferometer having a directional anisotropy disposed in the optical path thereof. As seen herein, the anisotropy is located between one of the partially reflecting mirrors and a fully reflecting mirror; however, it could equally well be located in any other path of the interferometer. Similarly, although a three-mirror interferometer is shown, other configurations known in the art may be employed to advantage in certain cases. An interferometric optical isolator in accordance herewith may be employed at various frequencies depending upon the nature of quarter-wave plates and Faraday rotator utilized; the present invention employs the teachings in the art to determine the parameters of the interferometer, such as its finesses, contrast factor, free spectral range and line width. The present invention may be embodied in a variety of configurations as well as employed to advantage in a variety of systems. For instance, separation of an oscillator and an amplifier as well as separation of optical transmitter and receiver utilizing a common optical antenna have been illustrated. However, the present invention may be employed to advantage in any system in which separation between optical waves travelling in opposite directions is desired.

The effects of the present invention may be tailored as shown in FIG. 1 by cascading two or more interferometric isolators of the present invention in series, with same or different parameters, in a manner similar to microwave filter cascading.

Thus, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A resonant optical isolator comprising a travelling wave interferometer including a beam path which has disposed along said path an anisotropic optical element having an axis for which the optical path length in a forward direction is different from the optical path length in the reverse direction.

2. A four-port resonant optical circulator which forms a ring interferometer and describes a closed-loop optical path providing a different optical path length for waves travelling in the clockwise and counterclockwise directions along the closed path comprising:

means for forming the closed-loop optical path including
    first means for admitting waves into the circulator, and
    second means for emitting waves from the circulator; and
  third means for providing around the closed-loop path a
    clockwise optical path length which is different from the
    counterclockwise optical path length.

3. An optical system including a plurality of optical isolators at least one of which is a resonant isolator that comprises a travelling wave interferometer including beam path which has disposed along said path an anisotropic optical element for which the optical path length in a forward direction is different from the optical path length in the reverse direction, said isolators being disposed in optical series circuit relationship.

4. The optical system according to claim 3 wherein at least one nonresonant optical isolator is included.

5. The invention according to claim 1 wherein the anisotropic optical element is a pair of quarter-wave plates separated by a Faraday rotator.

6. The invention according to claim 1 wherein the anisotropic optical element is a material having a different index of refraction for waves travelling in opposite directions therethrough.

7. The invention according to claim 2 wherein the first and second means are partially reflecting mirrors.

8. The invention according to claim 2 wherein said third means is a Faraday rotator with quarter-wave plates located adjacent to either end thereof.

9. The invention according to claim 2 wherein said third means is an anisotropic optical element having a different index of refraction for waves travelling in opposite directions therethrough.

* * * * *

PO-1050
(5/69)

UNITED STATES PATENT OFFICE
CERTIFICATE OF CORRECTION

Patent No. 3,617,129            Dated November 2, 1971

Inventor(s) MICHAEL L. SKOLNICK

It is certified that error appears in the above-identified patent and that said Letters Patent are hereby corrected as shown below:

Column 4, line 48, after "including" insert -- a --

Signed and sealed this 18th day of April 1972.

(SEAL)
Attest:

EDWARD M. FLETCHER, JR.
Attesting Officer

ROBERT GOTTSCHALK
Commissioner of Patents